United States Patent
Takada (10) Patent No.: US 8,118,565 B2
(45) Date of Patent: Feb. 21, 2012

(54) BLOWER AND ELECTRIC DEVICE WITH SUCH BLOWER MOUNTED THEREON

(75) Inventor: Masayuki Takada, Aichi (JP)

(73) Assignee: Panasonic Corporation, Osaka (JP)

(*) Notice: Subject to any disclaimer, the term of this patent is extended or adjusted under 35 U.S.C. 154(b) by 1057 days.

(21) Appl. No.: 11/997,431

(22) PCT Filed: Sep. 29, 2006

(86) PCT No.: PCT/JP2006/319467
§ 371 (c)(1),
(2), (4) Date: Jan. 31, 2008

(87) PCT Pub. No.: WO2007/040179
PCT Pub. Date: Apr. 12, 2007

(65) Prior Publication Data
US 2009/0104034 A1   Apr. 23, 2009

(30) Foreign Application Priority Data
Oct. 4, 2005 (JP) .................. 2005-290961

(51) Int. Cl.
F04B 49/06 (2006.01)
H02P 6/04 (2006.01)
(52) U.S. Cl. .................. 417/44.11; 318/400.1

(58) Field of Classification Search .................. 417/44.1, 417/44.11, 423.1; 318/400.1, 400.38
See application file for complete search history.

(56) References Cited

U.S. PATENT DOCUMENTS
2006/0099084 A1* 5/2006 Otaki et al. .................. 417/42
2006/0208686 A1* 9/2006 Takada .................. 318/801

FOREIGN PATENT DOCUMENTS
| JP | 10-089674 | | 4/1998 |
| JP | 2001-119983 | A | 4/2001 |
| JP | 2001-193688 | A | 7/2001 |
| JP | 2002-165477 | A | 6/2002 |
| JP | 2004-180476 | A | 6/2004 |

OTHER PUBLICATIONS

International Search Report for International Application No. PCT/JP2006/319467 dated Dec. 26, 2006.

* cited by examiner

*Primary Examiner* — Charles Freay
(74) *Attorney, Agent, or Firm* — RatnerPrestia (57) ABSTRACT

A supply current control circuit controls the voltage of a low-voltage direct-current power source so that the average current of an inverter circuit detected by a current detecting circuit becomes constant at a specified current value. Accordingly, characteristics that are little in the amount of change of air volume are obtained.

7 Claims, 12 Drawing Sheets

| Specified current value (A) | Specified number of revolutions (r/min) | | |
|---|---|---|---|
| | Weak | Average | Strong |
| Io (min) | NL0 | Constant minimum voltage | Constant minimum voltage |
| I1 | NL1 | | |
| I2 | NL2 | NM0 | |
| I3 | NL3 | NM1 | |
| I4 | NL4 | NM2 | NH0 |
| I5 | NL5 | NM3 | NH1 |
| ⋮ | ⋮ | ⋮ | ⋮ |
| I249 | NL249 | NM247 | NH245 |
| I250 | NL250 | NM248 | NH246 |
| I251 | NL251 | NM249 | NH247 |
| I252 | NL252 | NM250 | Constant maximum voltage |
| I253 | NL253 | NM251 | |
| I254 | NL254 | Constant maximum voltage | |
| I255(max) | NL255 | | |

BLOWER AND ELECTRIC DEVICE WITH SUCH BLOWER MOUNTED THEREON

This Application is a U.S. National Phase Application of PCT International Application PCT/JP2006/319467.

TECHNICAL FIELD

The present invention relates to a blower mounted on a ventilator, an air conditioning apparatus, etc., and an electric device with the blower mounted thereon.

BACKGROUND ART

Conventional blowers disclosed in Japanese Patent Unexamined Publication No. 2002-165477 and Japanese Patent Unexamined Publication No. H10-89674 will be described with reference to FIGS. 11 to 14.

Figure 11:
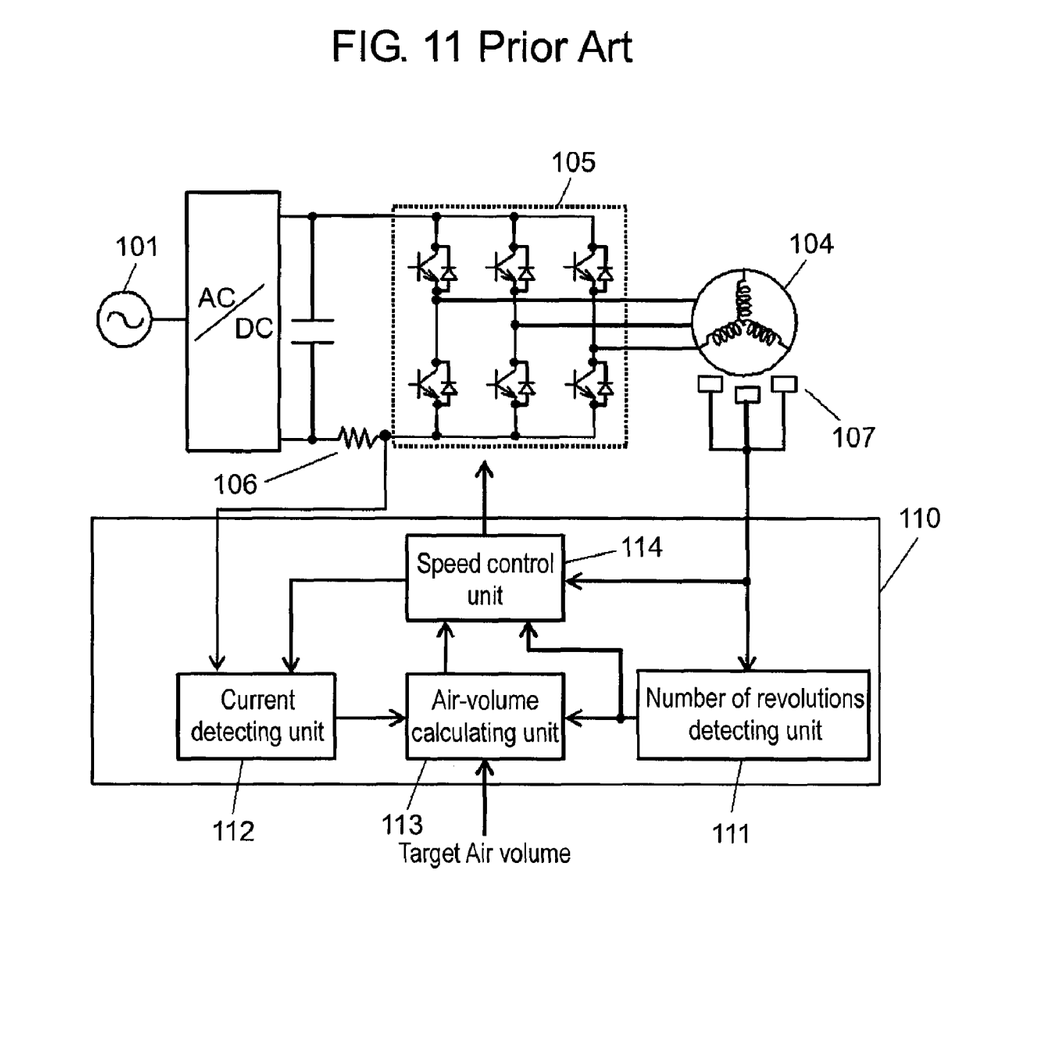
FIG. 11 is a circuit block diagram showing a conventional blower.

FIG. 11 shows a circuit of conventional brushless DC motor 104 (hereinafter referred to as motor 104). A direct-current voltage that is obtained by rectifying alternating-current voltage 101 is applied to motor 104 via inverter 105. The above circuit has current detector 106, position sensor 107 of a rotor, and control device 110. Control device 110 has number of revolutions detecting unit 111, current detecting unit 112, air-volume calculating unit 113, and speed control unit 114 as shown.

Figure 12:
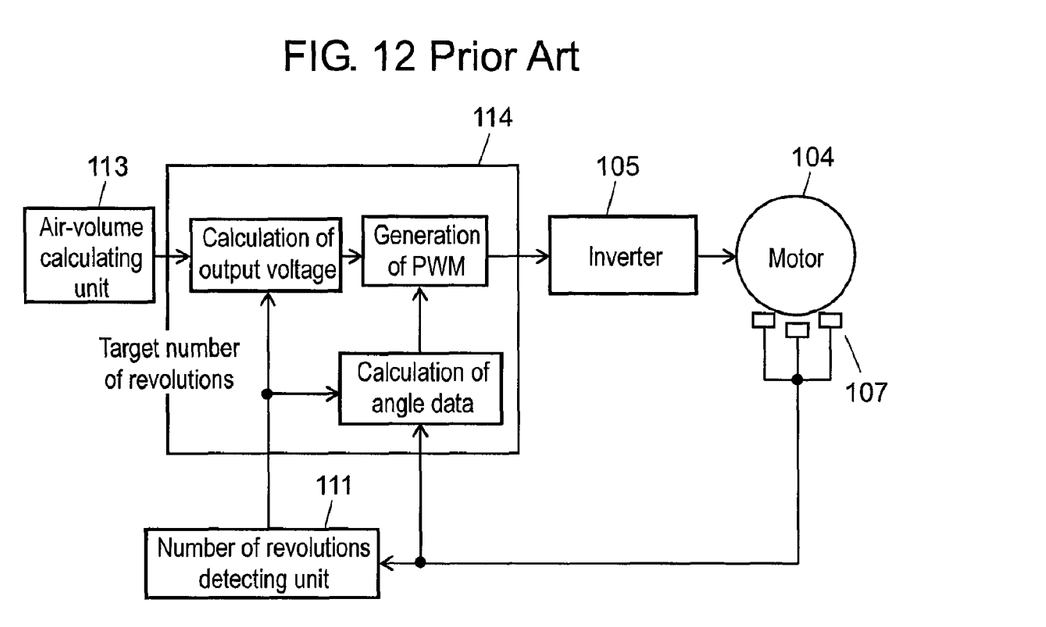
FIG. 12 is a view showing a circuit configuration of the fan shown in FIG. 11.

FIG. 12 shows a circuit of speed control unit 114. Air-volume calculating unit 113 calculates the target number of revolutions of motor 104 for attaining a target air volume. Speed control unit 114 generates a PWM signal that has an output voltage for attaining a target number of revolutions. Inverter 105 performs PWM driving of motor 104.

Figure 13:
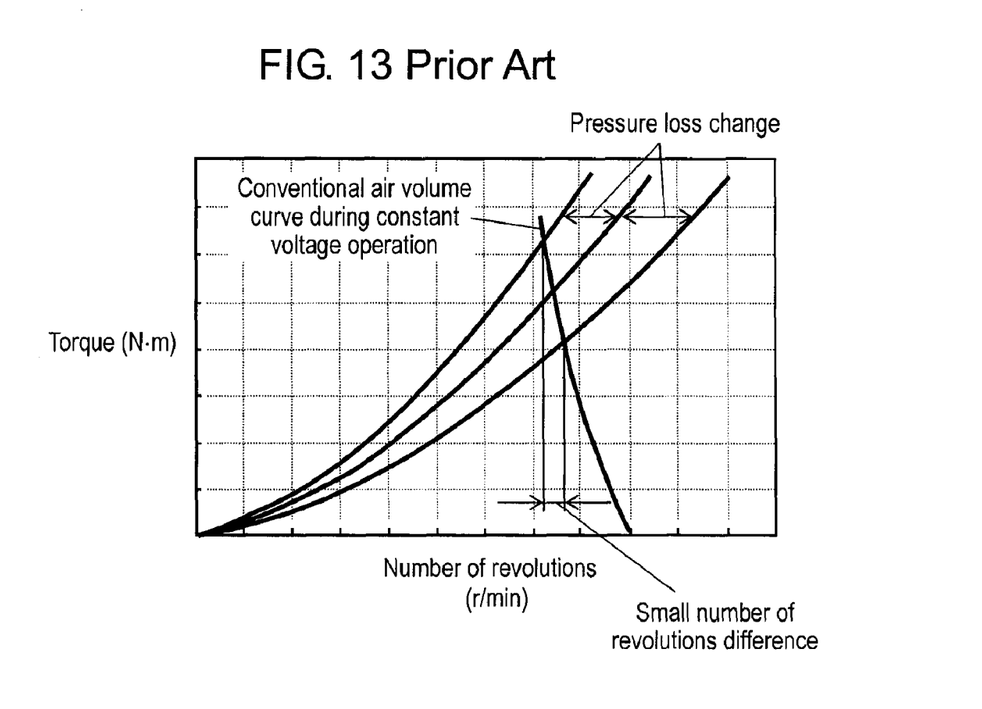
FIG. 13 is a view showing characteristics of a motor mounted on the fan shown in FIG. 11.
Figure 14:
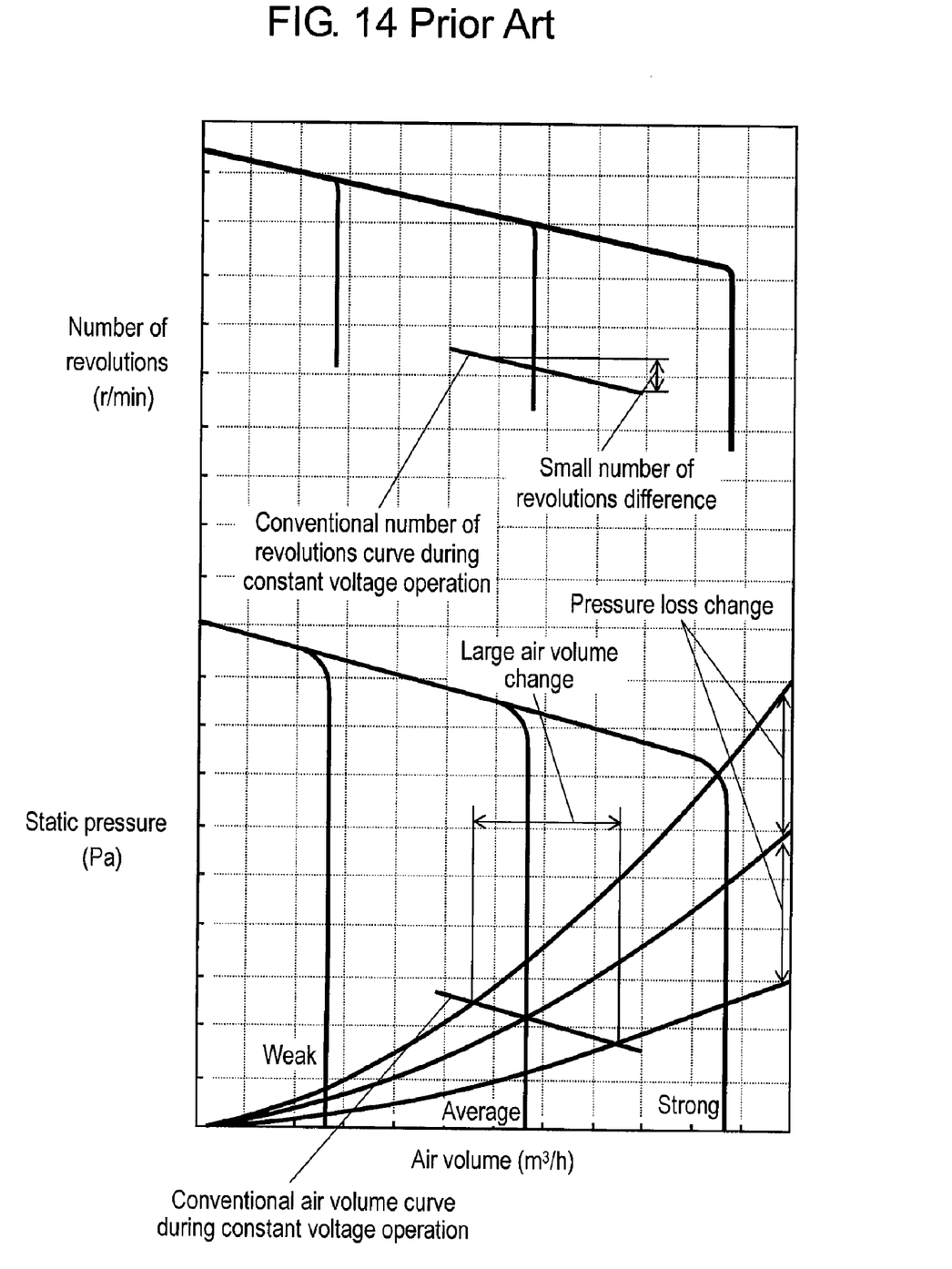
FIG. 14 is a view showing an example of characteristics of the fan shown in FIG. 11.

When motor 104 is driven with a constant voltage, as shown in FIG. 13, air volume changes greatly with little change in number of revolutions. Accordingly, if pressure loss changes slightly under the influence of external wind pressure, etc., the air volume will change greatly. The present invention provides a blower that realizes constant air volume control even when a pressure loss changes.

DISCLOSURE OF THE INVENTION

A blower of the invention includes: a fan; an air volume specifying circuit of the fan; a brushless DC motor that drives the fan; an inverter circuit of the brushless DC motor; a driving logic control circuit for the brushless DC motor; a number of revolutions detecting circuit of the brushless DC motor; a low-voltage direct-current power source that applies a low-voltage direct-current voltage to the inverter circuit; a supply current control circuit that controls an average current supplied to the inverter circuit; and a current specifying circuit that specifies the average current. The number of revolutions of the brushless DC motor is controlled by the current specifying circuit to control the air volume of the fan constantly.

REFERENCE NUMERALS

1: FAN
2: DRIVE COIL
3: MAGNET ROTOR
4: HALL ELEMENT
5: DRIVING LOGIC CONTROL CIRCUIT
6: INVERTER CIRCUIT
8: LOW-VOLTAGE DIRECT-CURRENT POWER SOURCE
9: RECTIFYING CIRCUIT
10, 26: VENTILATOR (ELECTRIC DEVICE) WITH A BLOWER MOUNTED THEREON
11: BRUSHLESS DC MOTOR
13, 27: NUMBER OF REVOLUTIONS DETECTING CIRCUIT
14: LOW-VOLTAGE DIRECT-CURRENT-VOLTAGE CHANGE CIRCUIT
15: AIR VOLUME SPECIFYING CIRCUIT
17: SPECIFIED NUMBER OF REVOLUTIONS STORAGE CIRCUIT
19: CURRENT SPECIFYING CIRCUIT
20, 28: AIR VOLUME CONTROL CIRCUIT
21: CURRENT DETECTING CIRCUIT
22: SUPPLY CURRENT CONTROL CIRCUIT
24: TORQUE CHARACTERISTIC CONTROL CIRCUIT

PREFERRED EMBODIMENTS FOR CARRYING OUT THE INVENTION

Hereinafter, embodiments of the invention will be described with reference to the drawings.

Embodiment 1

As shown in FIGS. 1 to 6, ventilator 10 (electric device) mounted with a blower has fan 1 mounted with brushless DC motor 11 (hereinafter referred to as motor 11) built therein, and discharges indoor air to the outdoors via duct 23. Motor 11 contains drive coil 2, magnet rotor 3, and hall element 4 for detecting a magnetic pole, magnetic flux waveform synthesizing circuit 12 that synthesizes the output waveform of hall element 4, inverter circuit 6, logic circuit 5, current waveform control circuit 7, low-voltage direct-current power source 8 that converts a commercial alternating-current power into a direct-current voltage of 45 V or less, current detecting circuit 21 that detects the current of inverter circuit 6, and supply current control circuit 22 that changes the output voltage of low-voltage direct-current power source 8 so that the average current of inverter circuit 6 may have a specified value.

Figure 1:
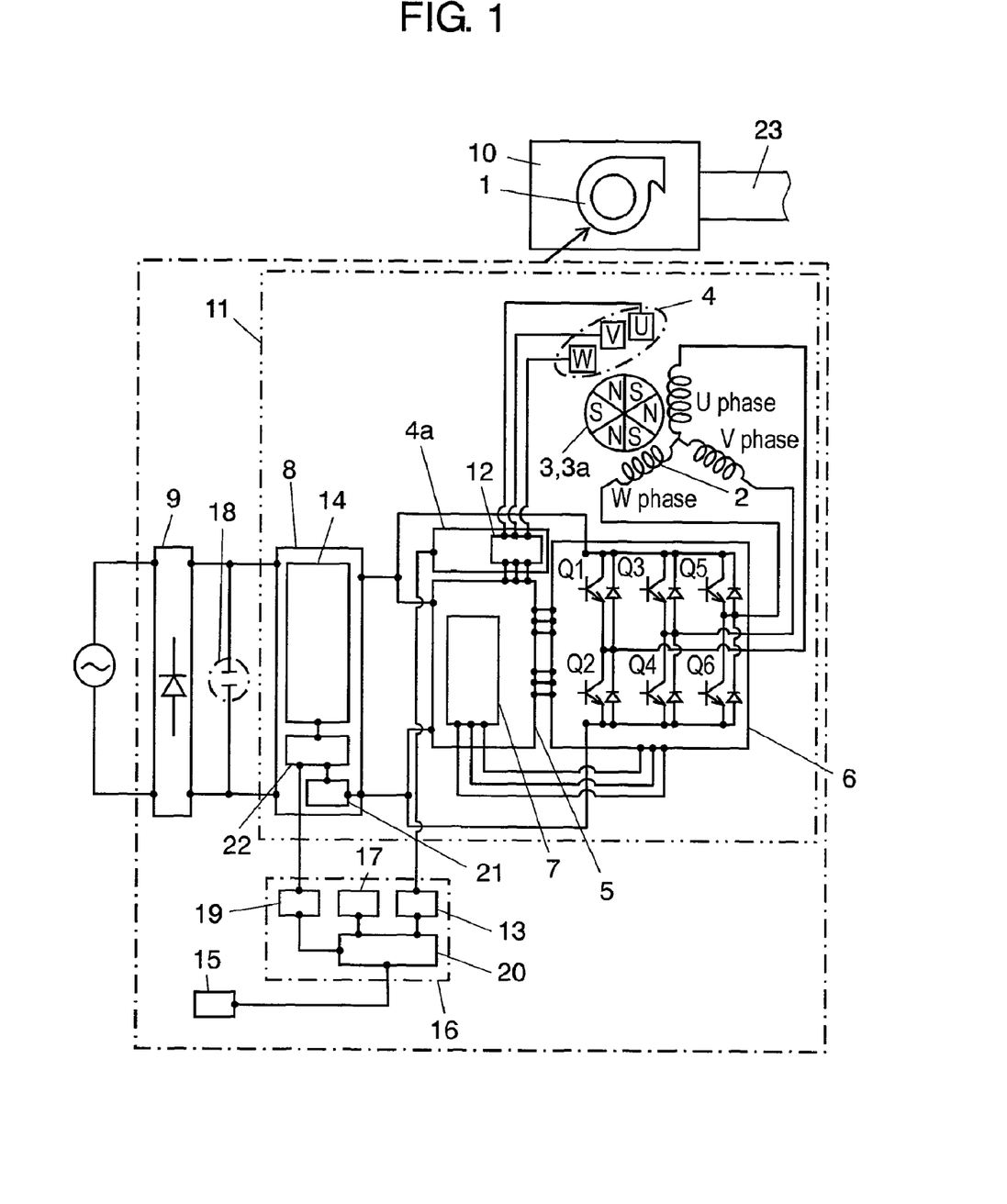
FIG. 1 is a view showing a configuration of a ventilator of Embodiment 1 of the present invention.
Figure 2:
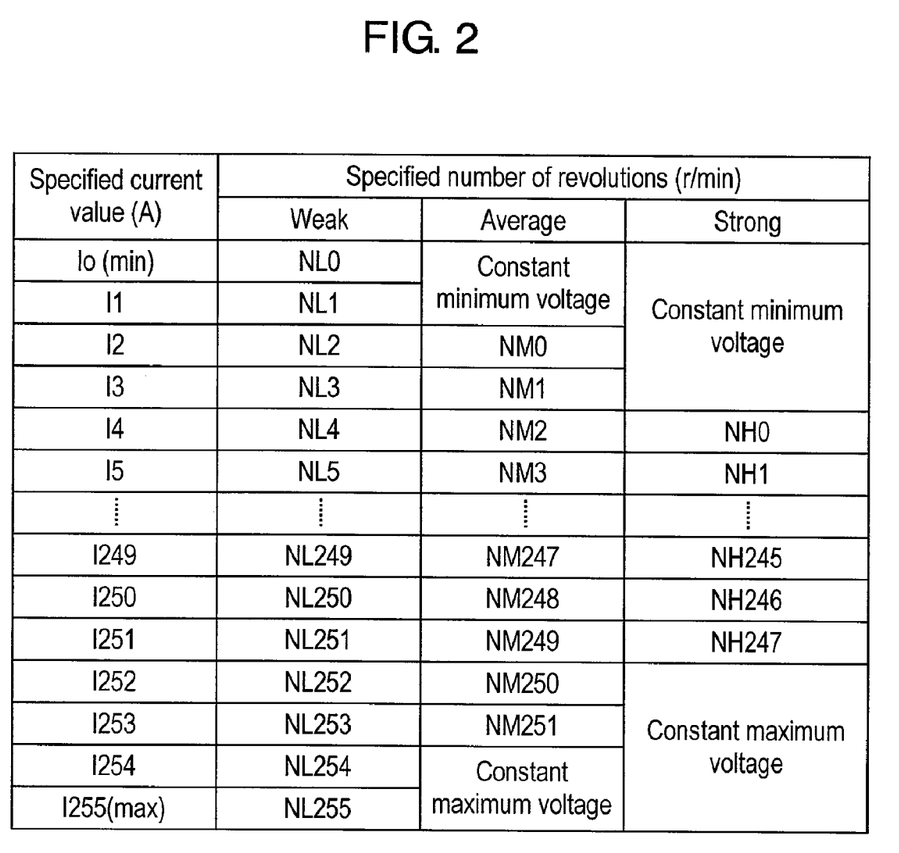
FIG. 2 is a view showing an example of storage of specified number of revolutions of the ventilator shown in FIG. 1.

Current detecting circuit 21 uses a shunt regulator for a reference voltage, and trims a current setting resistance to enhance detection precision. The above circuit is constituted by a hybrid IC except for some components. From motor 11, a pulse signal generated in pulse signal circuit 4a, and the output voltage of low-voltage direct-current power source 8 are output to the outside.

A high-voltage direct-current voltage that is obtained by rectifying and smoothing a commercial alternating-current power, and a current-specifying voltage that specifies an average current to be controlled by supply current control circuit 22 are input to motor 11. At an outside of motor 11, the following elements are arranged: rectifying circuit 9 that rectifies a commercial alternating-current power; smoothing capacitor 18; number of revolutions detecting circuit 13 that detects the number of revolutions of magnet rotor 3 from a pulse signal output from motor 11; current specifying circuit 19 that directs an average current value to be controlled by supply current control circuit 22; air volume specifying circuit 15 that specifies the air volume of fan 1; specified number of revolutions storage circuit 17 that stores a number of revolutions required for the specified air volume as a specified number of revolutions so as to associate with a plurality of specified currents to be specified by current specifying circuit 19; and air volume control circuit 20 that selects a specified number of revolutions corresponding to the specified air volume and current from specified number of revolutions storage means 17, and controls the current value of inverter circuit 6 so that the selected specified number of revolutions and an operational number of revolutions are equal to each other.

The above-mentioned number of revolutions detecting circuit 13, specified number of revolutions storage circuit 17, current specifying circuit 19, and air volume control circuit 20 are constituted by microcomputer 16. As a power source for microcomputer 16, a direct-current voltage generated by low-voltage direct-current power source 8 is reduced and supplied.

When a power source is turned on, a certain current is supplied to inverter circuit 6, and magnet rotor 3 rotates. Since the magnetic pole of magnet rotor 3 is constituted by polar anisotropic magnets 3a, both the induced voltage of drive coil 2 and the detected waveform of hall element 4 are substantially sinusoidal waveforms. Magnetic flux waveform synthesizing circuit 12 subtracts a V-phase waveform from a U-phase waveform of hall element 4 in order to remove a harmonic component of a U-phase current, subtracts a W-phase waveform from the V-phase waveform of hall element 4 in order to remove an harmonic component of a V-phase current, and subtracts the U-phase waveform from the W-phase waveform of hall element 4 in order to remove a harmonic component of the W-phase current.

Current waveform control circuit 7 uses switching elements Q1 to Q6 of inverter circuit 6 in a non-saturated state close to saturation so that each waveform becomes substantially analogous to a waveform from which the harmonic component made by magnetic flux distribution synthesizing circuit 12 is removed. Accordingly, there is no steep change in current of inverter circuit 6, and generation of ripples is also suppressed. Supply current control circuit 22 always controls low-voltage direct-current-voltage change circuit 14 so that the average current of inverter circuit 6 becomes equal to specification of current specifying circuit 19. As a result, as shown in FIG. 3, motor 11 makes a constant torque operation, and even when a pressure loss changes under the influence of external wind pressure, etc., the resulting amount of change of air volume can be made small.

Also, the process of constant air volume control is as follows. That is, number of revolutions detecting circuit 13 counts the number of pulses of hall element 4 to detect the average number of revolutions of magnet rotor 3, air volume control circuit 20 selects a specified number of revolutions corresponding to an air volume and a current from specified number of revolutions storage circuit 17, and compares it with the number of revolutions detected by number of revolutions detecting circuit 13. Then, as shows in FIG. 5, when the number of revolutions is larger than the specified number of revolutions, it is determined that the air volume of fan 1 is smaller than air volume specified by air volume specifying circuit 15, and then an average current value specified by current specifying circuit 19 is raised. On the other hand, when the number of revolutions is smaller than the specified number of revolutions, it is determined that the air volume of fan 1 is larger than the air volume specified by air volume specifying circuit 15, and then an average current value specified by current specifying circuit 19 is lowered.

By repeatedly performing this control, the control that becomes always constant with respect to a specified air volume can be made.

Figure 3:
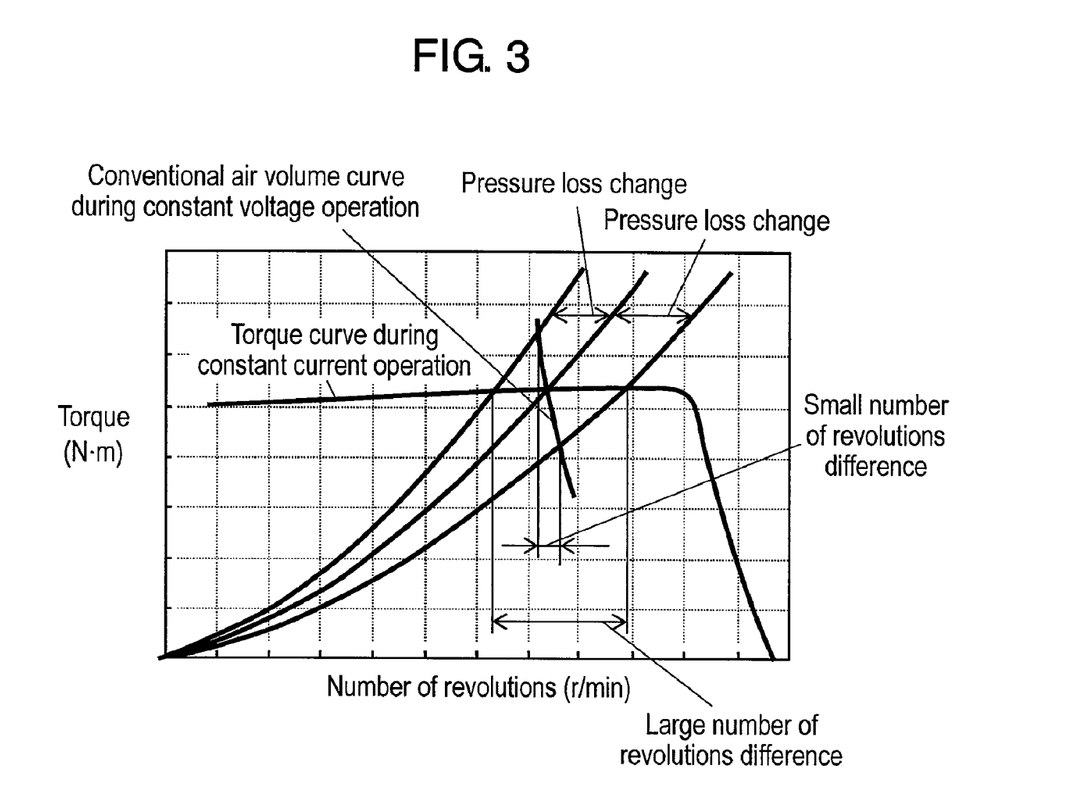
FIG. 3 is a view showing an example of characteristics of a motor mounted on the ventilator shown in FIG. 1.
Figure 4:
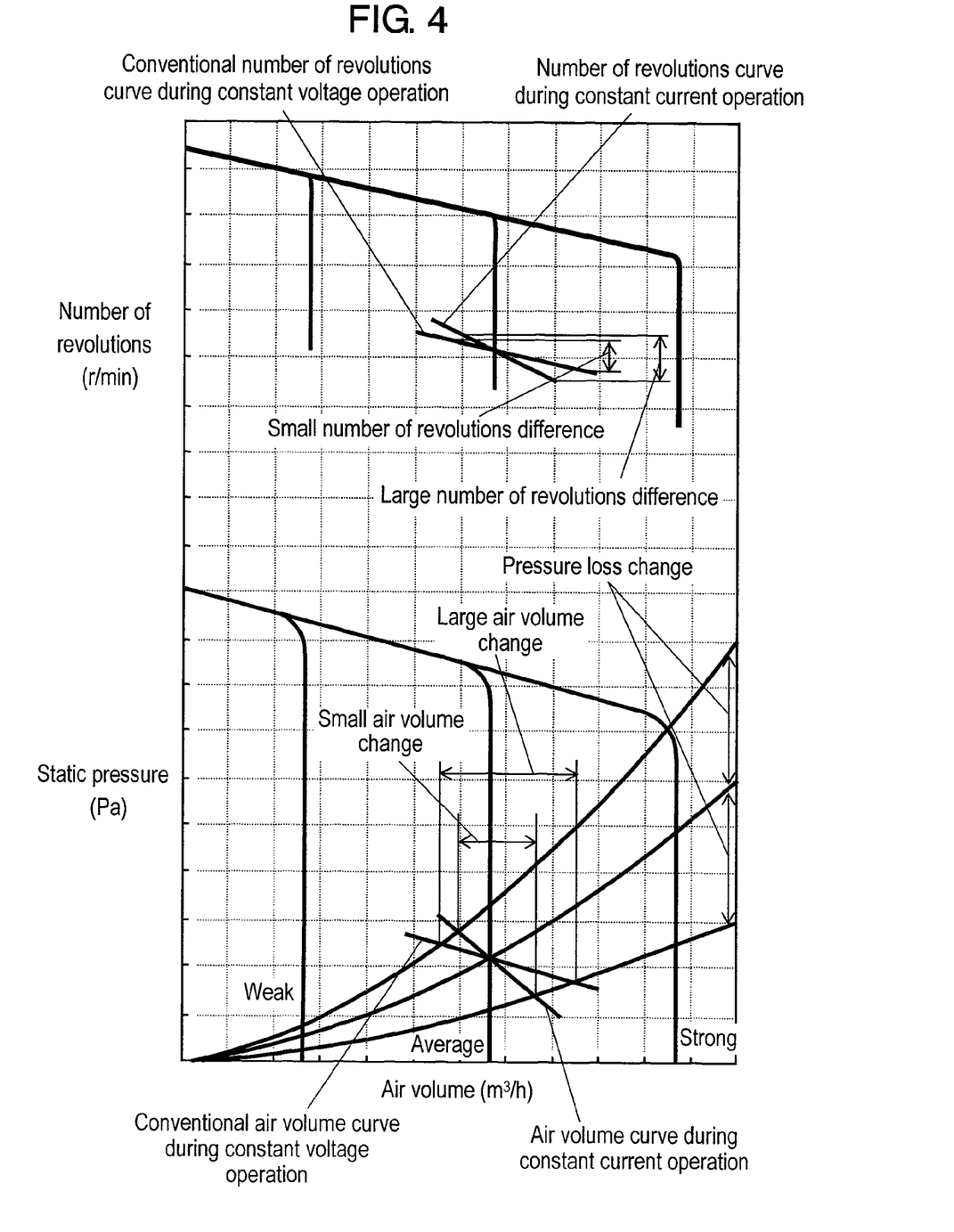
FIG. 4 is a view showing an example of characteristics of the ventilator shown in FIG. 1.
Figure 5:
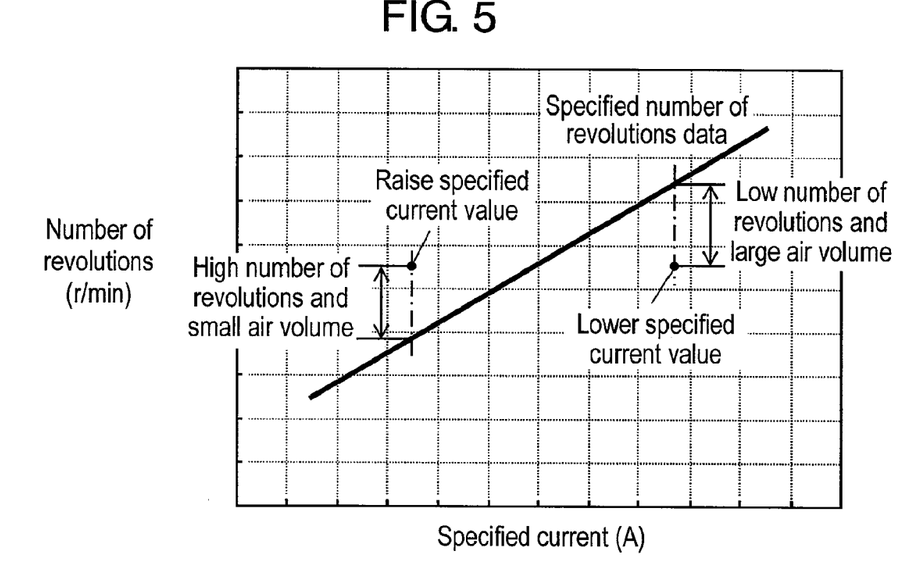
FIG. 5 is a view showing an air volume control process of the ventilator shown in FIG. 1.
Figure 6:
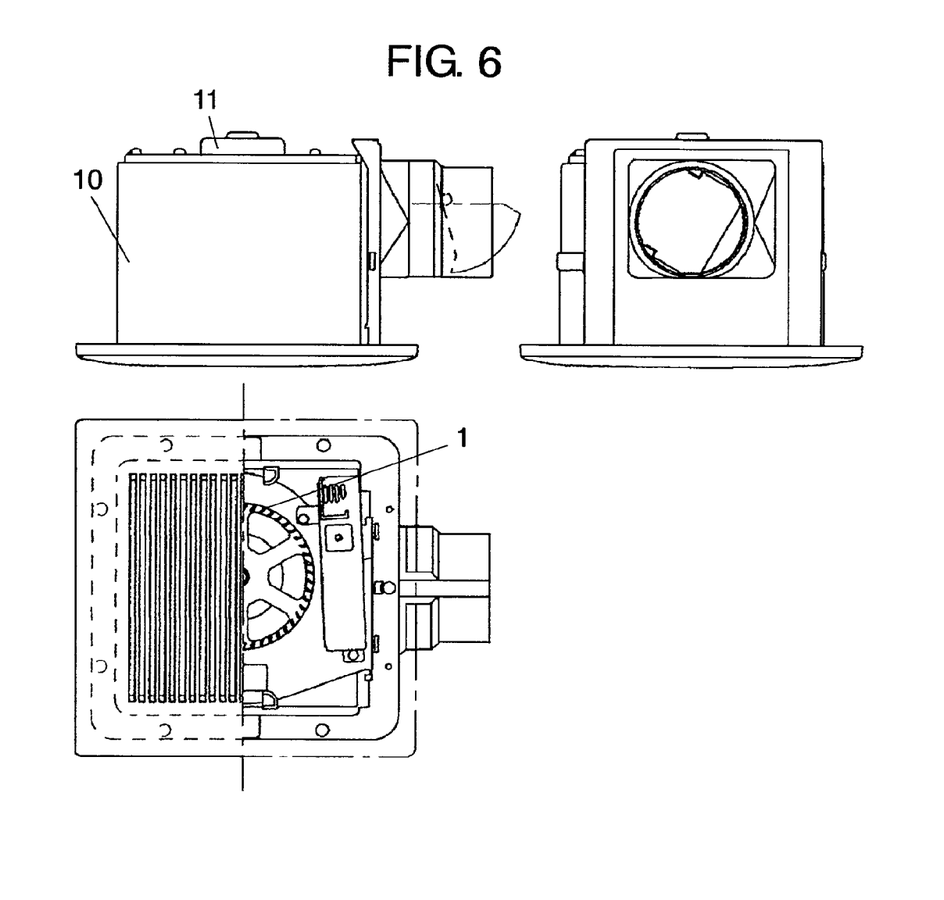
FIG. 6 is an appearance view of the ventilator shown in FIG. 1.

Here, when a pressure loss (load of motor 11) changes under the influence of external wind pressure, etc., the change of an operating point of motor 11 and fan 1 are as shown in FIGS. 3 and 4. In this case, the air volume of fan 1 is constantly controlled by repeatedly performing the control shown in FIG. 5.

In addition, in the present embodiment, the output voltage of low-voltage direct-current power source 8 is changed to control the current of inverter circuit 6 constantly. However, the duty of PWM may be changed by fixing a direct-current voltage, and performing PWM control of a motor current. Even in this case, a difference is not caused in the operation effect that constant air volume control can be realized.

In addition, in the present embodiment, switching elements Q1 to Q6 of inverter circuit 6 are used in a non-saturated state close to saturation, however, it is possible to adopt a configuration in which each phase current waveform is controlled by performing PWM control (chopping) of Q1, Q3, and Q5 or Q2, Q4, and Q6. Even in this case, a difference is not caused in the operation effect that constant air volume control can be realized.

In addition, if logic circuit 5 sets a conduction angle of the coil of motor 11 to 150 degrees or more and 180 degrees or less, a steep change does not occur in a motor current.

Embodiment 2

As shown in FIGS. 7 to 10, ventilator 26 mounted with a blower contains fan 25 mounted with brushless DC motor 11 (hereinafter referred to as motor 11). Number of revolutions detecting circuit 27 performs the frequency/voltage conversion (F/V conversion) of a pulse signal from motor 11 to detect a number of revolutions. Air volume control circuit 28 changes a current value specified by current specifying circuit 19 according to a number of revolutions in order to realize the number of revolutions and torque characteristic (FIG. 8) of motor 11 that are required in order to output an air volume specified by air volume specifying circuit 15.

Figure 7:
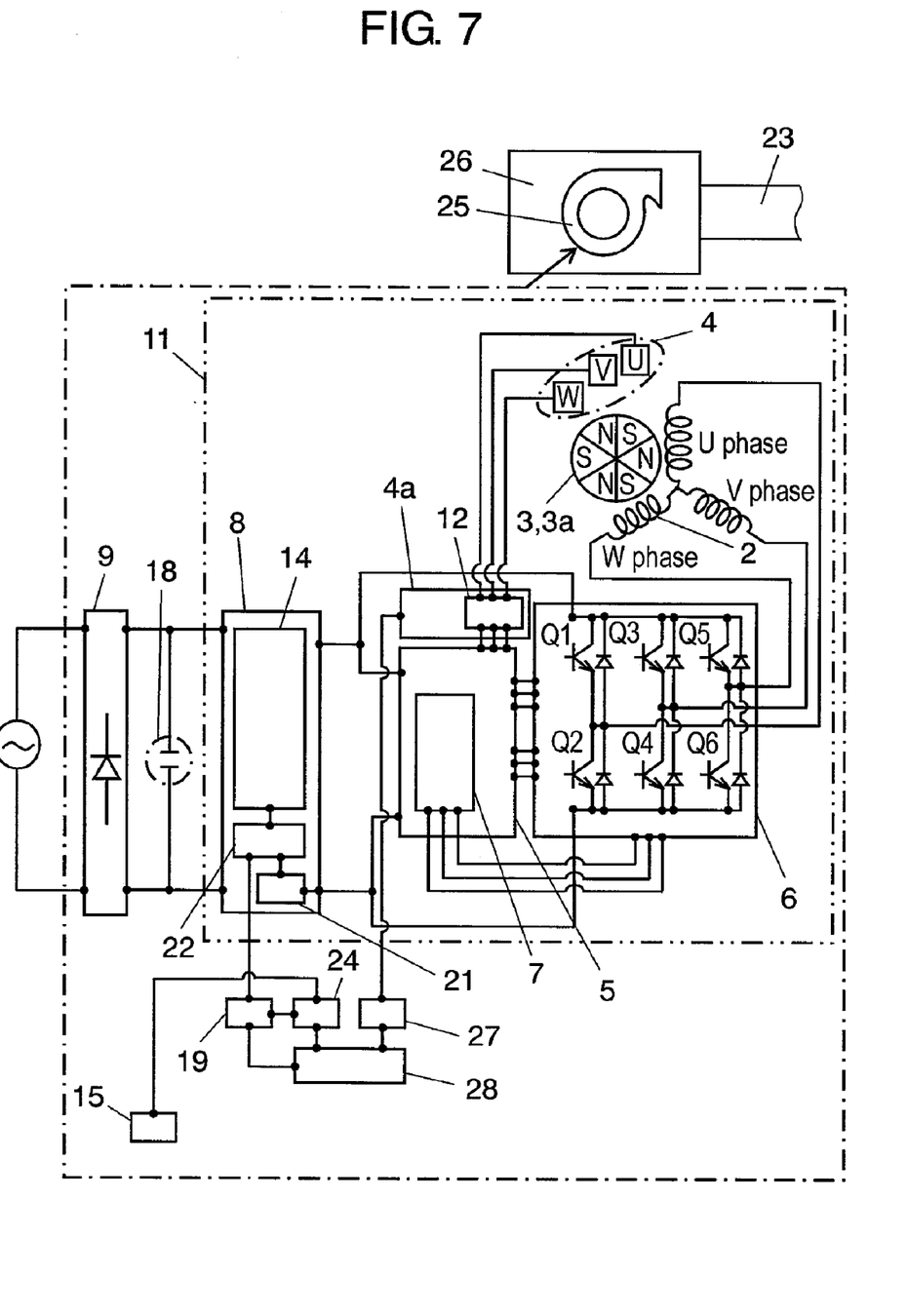
FIG. 7 is a view showing the configuration of a ventilator of Embodiment 2 of the invention.

Torque characteristic control circuit 24 controls current specifying circuit 19 so as to realize the number of revolutions and torque characteristic of motor 11 corresponding to a plurality of air volumes specified by air volume specifying circuit 15. Other components are the same as those of Embodiment 1. These same components are denoted by the same reference numerals, and the detailed description thereof is omitted.

Figure 8:
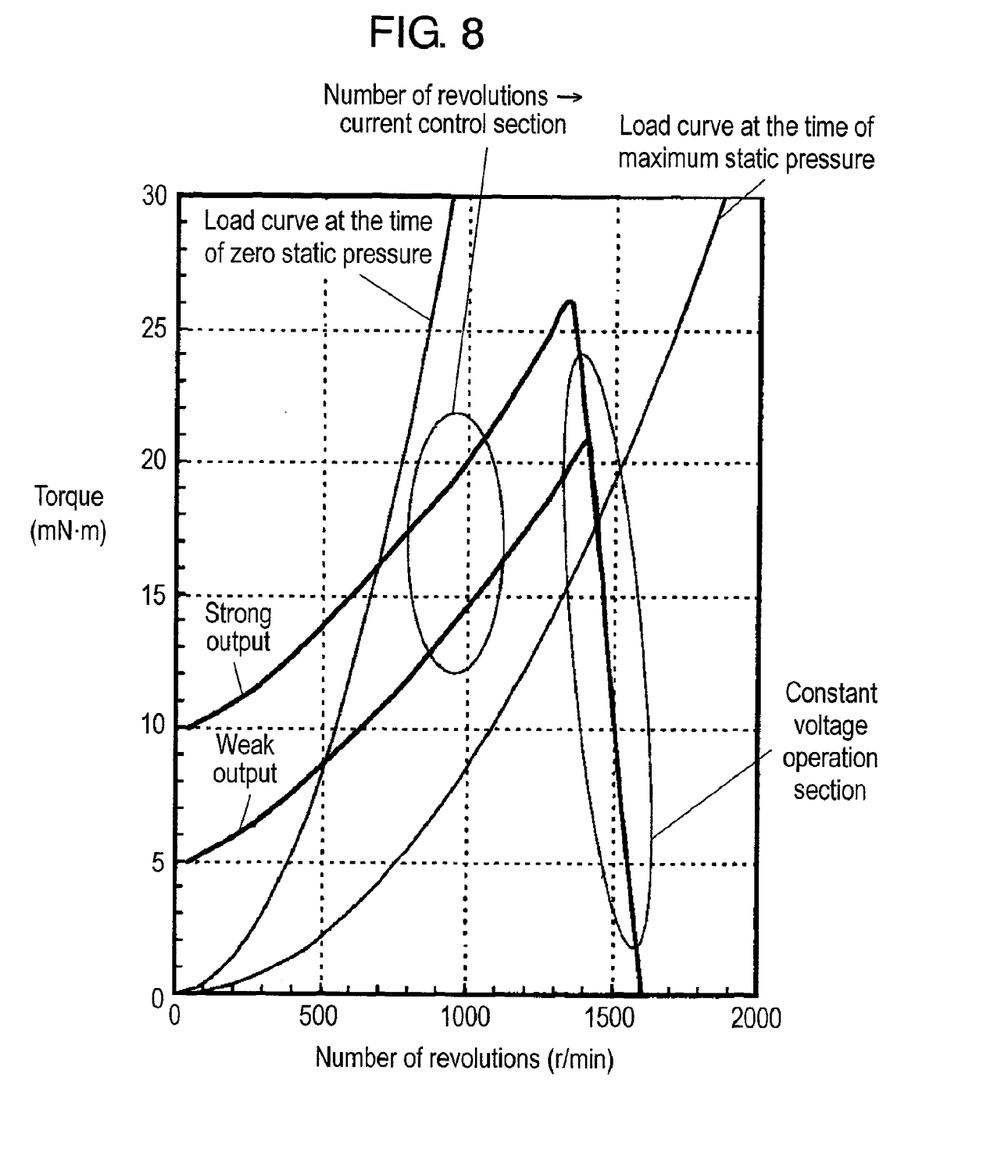
FIG. 8 is a view showing an example of characteristics of a motor mounted on the ventilator shown in FIG. 7.
Figure 9:
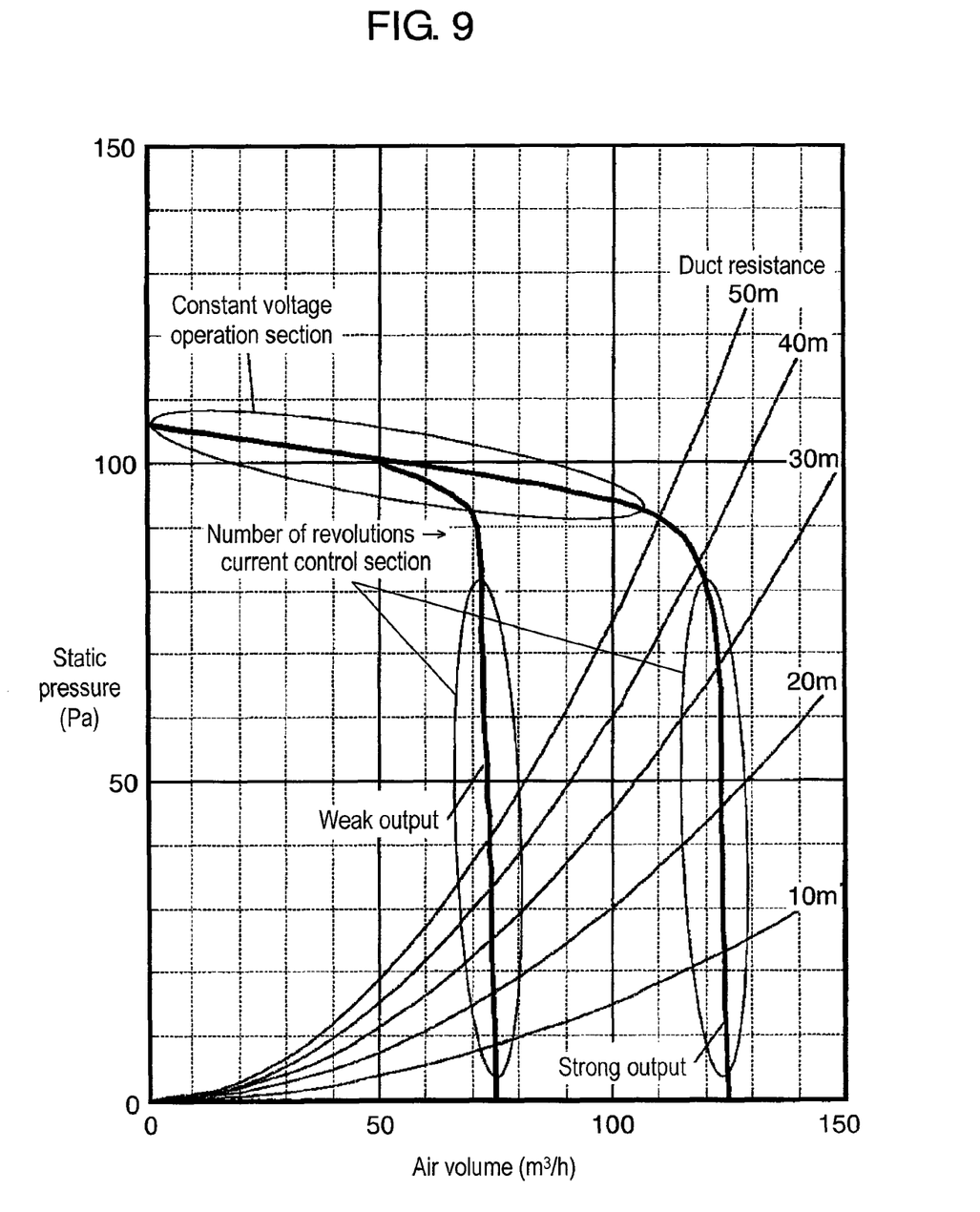
FIG. 9 is a view showing an example of characteristics of the ventilator shown in FIG. 7.
Figure 10:
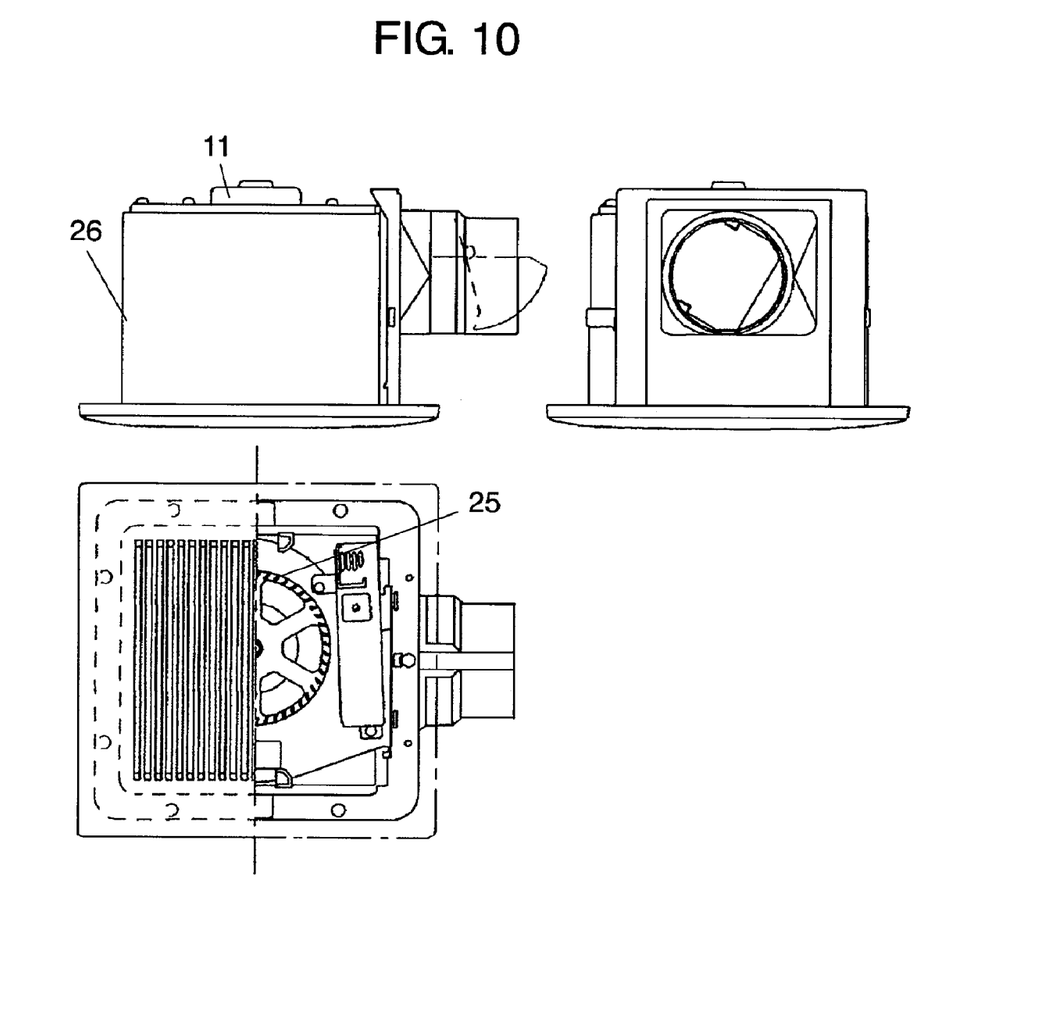
FIG. 10 is an appearance view of the ventilator shown in FIG. 7.

As described above, since air volume control circuit 28 controls the current of inverter circuit 6 so as to become high as the number of revolutions of fan 25 becomes high, as shown in FIG. 8, the number of revolutions and torque characteristic of the motor becomes a characteristic that the torque become large as the number of revolutions rises. Even when a pressure loss, such as external wind pressure or duct length, changes, air volume can be controlled constantly by virtue of this characteristic.

INDUSTRIAL APPLICABILITY

Since the blower of the present invention can obtain the characteristics of constant air volume without being influenced by a pressure loss, the fan is suitable for mounting onto a ventilator, an air conditioning apparatus, etc.

The invention claimed is:

1. A blower comprising:
   a fan;
   an air volume specifying circuit of the fan;
   a brushless DC motor that drives the fan;
   an inverter circuit of the brushless DC motor;
   a driving logic control circuit that performs driving control of the brushless DC motor;
   a number of revolutions detecting circuit that detects a number of revolutions of the brushless DC motor;
   a low-voltage direct-current power source that applies a low-voltage direct-current voltage to the inverter circuit;
   a supply current control circuit that controls an average current supplied to the inverter circuit;
   a current specifying circuit that specifies the average current, wherein the number of revolutions of the brushless DC motor is controlled by the current specifying circuit to maintain the air volume of the fan at a constant level,
   a specified number of revolutions storage circuit that stores a required number of revolutions of the brushless DC motor as a specified number of revolutions for every specified air volume and every specified current; and
   an air volume control circuit that selects a specified number of revolutions corresponding to the specified air volume and current from the specified number of revolutions storage circuit, and changes the average current specified by the current specifying circuit so that the number of revolutions of the brushless DC motor becomes the specified number of revolutions.

2. The blower of claim 1, wherein the air volume control circuit changes the value of the average current specified by the current specifying circuit according to a size of a detected voltage of the number of revolutions detecting circuit in order to obtain a specified air volume.

3. The blower of claim 1, wherein the brushless DC motor has a magnet rotor of a polar anisotropic magnet, and the driving logic control circuit sets a conduction angle of an voltage to be applied to the brushless DC motor to 150 degrees or more and 180 degrees or less.

4. An electric device comprising:
   the blower of claim 1 mounted thereon.

5. An electric device comprising:
   the blower of claim 1 mounted thereon.

6. An electric device comprising:
   the blower of claim 2 mounted thereon.

7. An electric device comprising:
   the blower of claim 3 mounted thereon.

* * * * *